United States Patent
Kumar et al.

(10) Patent No.: US 7,472,266 B2
(45) Date of Patent: Dec. 30, 2008

(54) FAULT RESILIENT BOOT IN MULTI-PROCESSOR SYSTEMS

(75) Inventors: Mohan J. Kumar, Aloha, OR (US); Murugasamy Nachimuthu, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 432 days.

(21) Appl. No.: 11/322,997

(22) Filed: Dec. 30, 2005

(65) Prior Publication Data
US 2007/0157011 A1    Jul. 5, 2007

(51) Int. Cl.
*G06F 9/00* (2006.01)
*G06F 9/24* (2006.01)
(52) U.S. Cl. ............................................. 713/1; 713/2
(58) Field of Classification Search ....................... 713/1
See application file for complete search history.

(56) References Cited

U.S. PATENT DOCUMENTS

| | | | | |
|---|---|---|---|---|
| 5,951,683 A * | 9/1999 | Yuuki et al. | ..................... | 713/1 |
| 6,058,475 A * | 5/2000 | McDonald et al. | ............. | 713/2 |
| 6,601,165 B2 * | 7/2003 | Morrison et al. | ............... | 713/2 |
| 2003/0005275 A1 | 1/2003 | Lam | | |
| 2003/0009654 A1 | 1/2003 | Nalawadi et al. | | |
| 2003/0163765 A1 | 8/2003 | Eckardt et al. | | |

OTHER PUBLICATIONS

International Search Report and Written Opinion of the International Searching Authority; Dated Nov. 28, 2007; PCT/US2006/048295 (14 pgs.).
"Intel Server Platform SR8770BH2 Field Error Reference Guide", Intel Enterprise Platforms and Service Division Mar. 2004 XP002458626 p. 21, Line 17-p. 22, last line, 40 pgs.

* cited by examiner

*Primary Examiner*—Tse Chen
*Assistant Examiner*—Stefan Stoynov
(74) *Attorney, Agent, or Firm*—Robert D. Anderson

(57) ABSTRACT

In some embodiments a boot progress of a System Boot Strap Processor in a multi-processor system is monitored and a boot processor failure is detected using an Application Processor. If the boot processor failure is detected at least a portion of the system is reinitialized (and/or the system is rebooted). Other embodiments are described and claimed.

26 Claims, 2 Drawing Sheets

FAULT RESILIENT BOOT IN MULTI-PROCESSOR SYSTEMS

TECHNICAL FIELD

The inventions generally relate to fault resilient boot in multi-processor systems.

BACKGROUND

Reliable system boot is a significant RAS (Reliability Availability Serviceability) feature in multi-processor platforms. A separate service processor is provided on the platform to select the system boot strap processor and to ensure that the system boots. In case of a boot failure, the service processor is responsible for disabling the failed processor and selecting an alternative processor. This process is known as a "Fault Resilient Boot" (FRB). Currently, implementing fault resilient booting requires a service processor on the platform.

BRIEF DESCRIPTION OF THE DRAWINGS

The inventions will be understood more fully from the detailed description given below and from the accompanying drawings of some embodiments of the inventions which, however, should not be taken to limit the inventions to the specific embodiments described, but are for explanation and understanding only.

DETAILED DESCRIPTION

Figure 1:
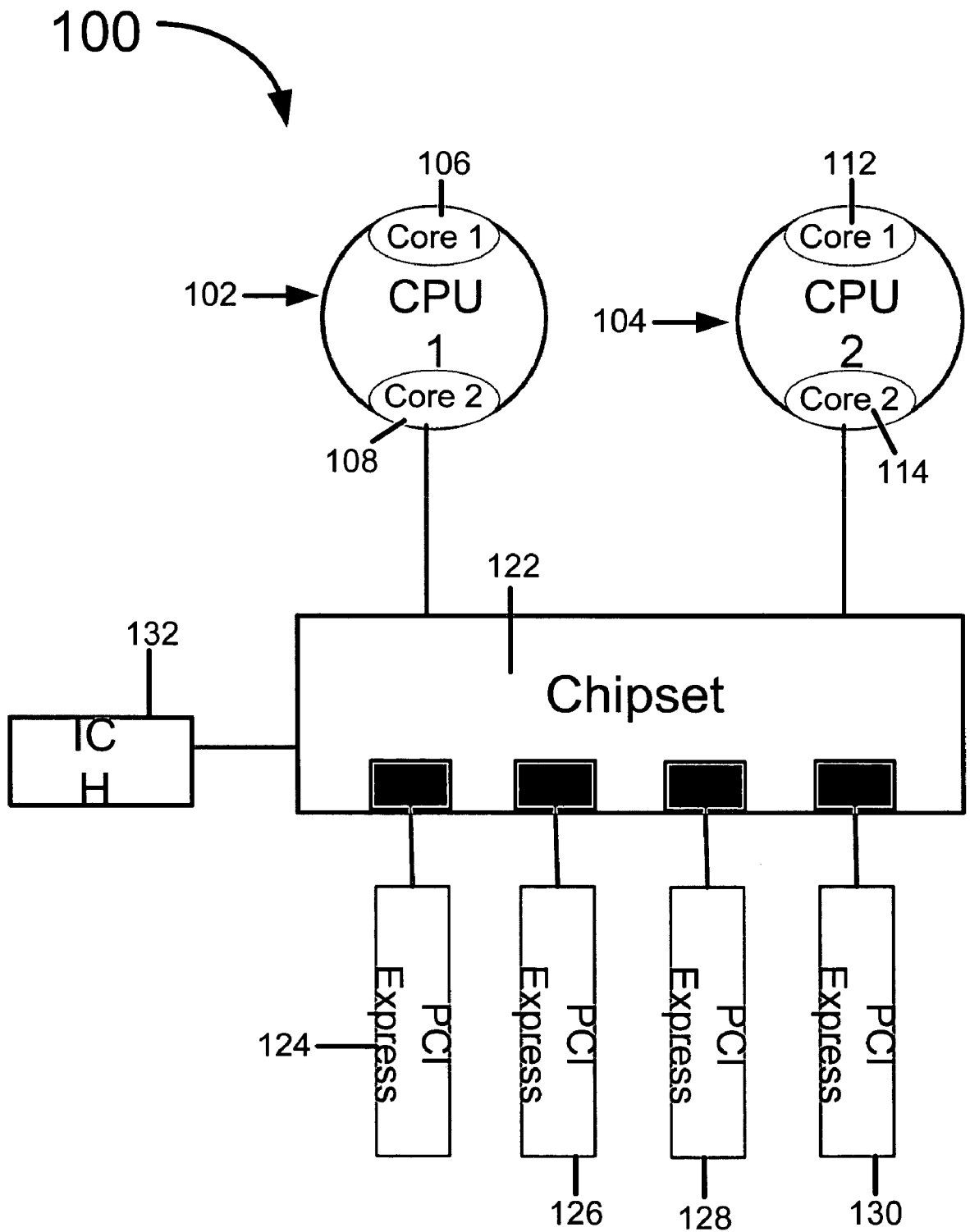
FIG. 1 illustrates a multi-processor (MP) system according to some embodiments of the inventions.

Some embodiments of the inventions relate to fault resilient boot in multi-processor systems.

In some embodiments a boot progress of a System Boot Strap Processor in a multi-processor system is monitored and a boot processor failure is detected using an Application Processor. If the boot processor failure is detected at least a portion of the system is reinitialized (and/or the entire system is rebooted).

In some embodiments a system includes a System Boot Strap Processor and an Application Processor to monitor a boot progress of the System Boot Strap Processor, to detect a boot processor failure, and to reinitialize at least a portion of the system (and/or reboot the entire system) if the boot processor failure is detected.

In some embodiments a system includes at a minimum a first processor and a second processor. One processor of the system becomes a System Boot Strap Processor, and all other processor of the system become Application Processors. At least one Application Processor is to monitor a boot progress of the System Boot Strap Processor, to detect a boot processor failure, and to reinitialize at least a portion of the system (and/or reboot the system) if the boot processor failure is detected.

In some embodiments an article includes a computer readable medium having instructions thereon which when executed cause a computer to monitor a boot progress of a System Boot Strap Processor in a multi-processor system using an Application Processor, detect a boot processor failure using the Application Processor, and reinitialize at least a portion of the system (and/or reboot the entire system) if the boot processor failure is detected.

Currently, implementing fault resilient booting requires a service processor on the platform. However, according to some embodiments, a firmware-based solution is used to implement fault resilient booting without any requirement for a service processor. The firmware may be Basic Input/Output System (BIOS), on-package firmware or microcode. According to some embodiments, this solution may even be implemented on low end dual processor (DP) server platforms.

Intel's high-speed interconnect referred to as "CSI" is likely to become very widely used. The CSI link interconnects will be used more and more as multi-core, multi-threaded threaded processors become more popular. Link based architecture such as CSI allows for system partitioning. However, it may be impractical to implement a service processor for every possible system partition. Therefore, fault resilient booting according to some embodiments is very advantageous because it does not require a service processor.

Eventually even volume, value and workstation platforms will likely be based on multi-core (MC) processors. As a result, these volume, value, and workstation platforms will require the same reliability features as four way platforms in use today. According to some embodiments lower end systems can also use a fault resilient booting reliability feature without any associated cost burden. Further, for high end enterprise servers with partitioning capability, according to some embodiments system partitions can implement fault resilient boot (FRB) without requiring a per partition service processor.

Existing solutions for fault resilient boot are based on use of a service processor and/or external hardware. According to some embodiments system firmware (for example, BIOS) is all that is necessary to perform fault resilient boot, thus saving hardware costs.

FIG. 1 illustrates a multi-processor (MP) system 100 according to some embodiments. System 100 includes a first processor (and/or processor socket) 102 and a second processor (and/or processor socket) 104. Processor 102 is a multi-core (MC) processor including a first core 106 and a second core 108. Similarly, processor 104 is a multi-core (MC) processor including a first core 112 and a second core 114. System 100 also includes a chipset 122 coupled to four PCI Express buses 124, 126, 128, 130. An I/O Controller Hub (ICH) 132 is also coupled to chipset 122. Processor 102 and processor 104 are each coupled to chipset 122 via a respective interconnect (for example, a high speed interconnect such as a CSI link).

Although some embodiments have been described herein as including a high speed interconnect such as a CSI link, according to some embodiments any link-based architecture may be used (for example, any link-based architecture such as a multiple front side bus architecture, CSI, hypertransport, etc.)

According to some embodiments a Fault Resilient Boot (FRB) may be implemented without requiring a service processor. For example, in multi-processor (MP) systems (for example, system 100 illustrated in FIG. 1) only one processor (that is, only one processor core) becomes the System Boot Strap Processor (SBSP) and the other processors (cores) idle. According to some embodiments the idling processors may be taken advantage of to implement a fault resilient boot (FRB). According to some embodiments the non-boot strap processors (commonly referred to as Application processors or APs) are used to monitor the boot progress and reinitialize at least a portion of the system (and/or reboot the system) if it detects a boot processor failure.

With reference to FIG. 1, the processor package (or processor core) that first writes its Local APIC (Advanced Programmable Interrupt Controller) ID to a chipset control register becomes the System Boot Strap Processor (SBSP). Although a particular SBSP selection process is described herein, it is noted that any other mechanisms may be used for SBSP selection according to some embodiments. All other cores than the SBSP become an Application Processor (AP). The AP can now read the chipset reset register to detect which core became the SBSP. Instead of putting the AP to sleep during the initialization of the system by the SBSP, the AP starts monitoring the SBSP boot progress (for example, as outlined by the flowchart in FIG. 2).

Figure 2:
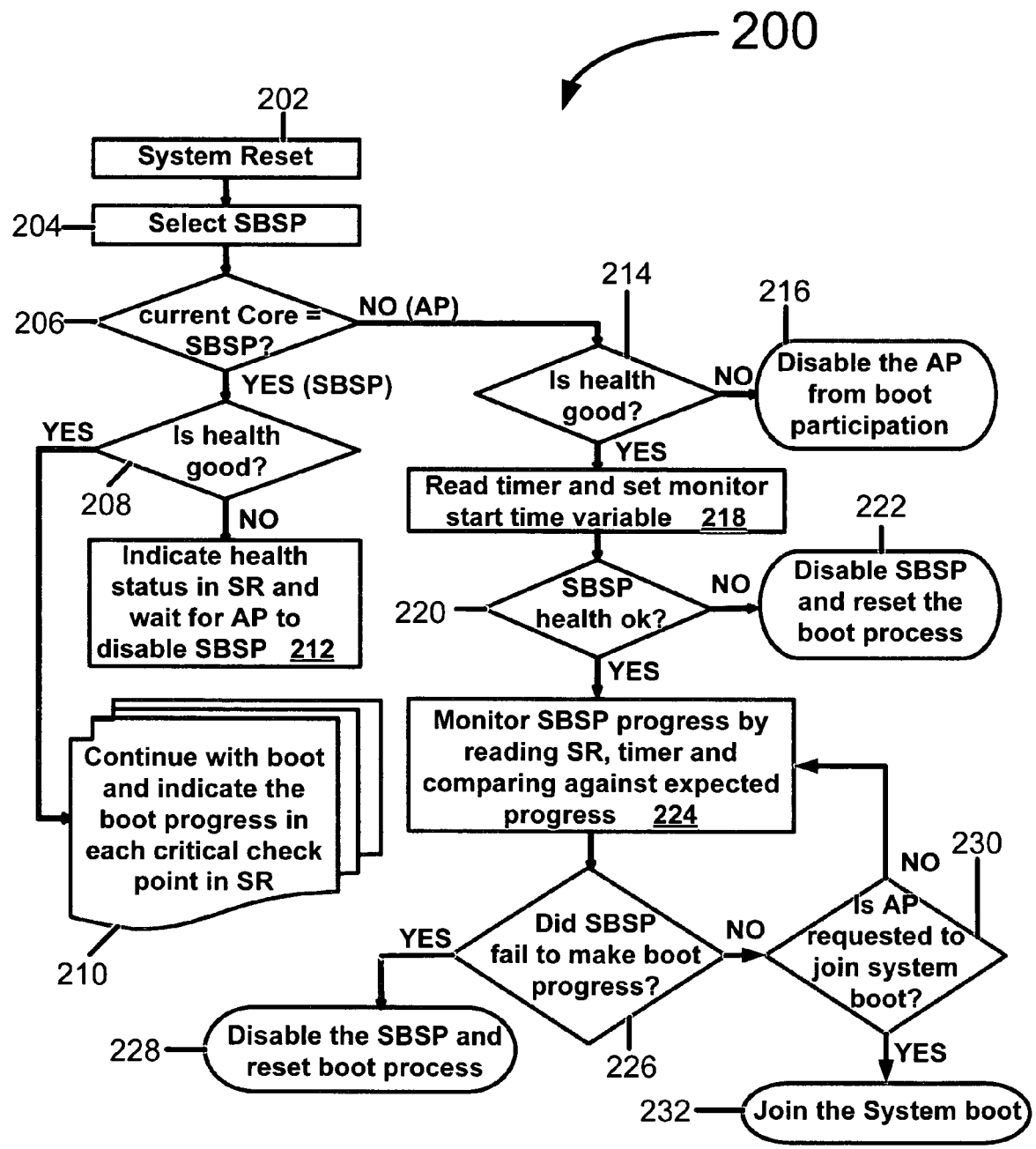
FIG. 2 illustrates a flowchart according to some embodiments of the inventions.

FIG. 2 illustrates a flowchart 200 according to some embodiments. At 202 a system reset occurs. Then at 204 the System Boot Strap Processor (SBSP) is chosen (for example, the first processor package (core) that writes its Local APIC ID to a chipset control register). Previously disabled processors (or cores) will not participate in the SBSP selection. At 206 a determination is made as to whether the current processor core is the SBSP. If it is the SBSP at 206 the SBSP makes a determination at 208 as to whether the SBSP's health is good (for example, by checking Built in Self Test results). If the health is good at 208, then the SBSP continues with the boot at 210. The SBSP also indicates at 210 the boot progress at critical checkpoints of the boot process in a chipset Scratch Register (SR) that is readable by the APs. If the health of the SBSP is not good at 208 then the health status of the SBSP is indicated at 212, and the SBSP waits for the monitoring AP to disable the SBSP.

For an AP flow moves from 206 to 214, where each AP checks its health (for example, according to some embodiments by checking the Built in Self Test (BIST) results). If the AP is not healthy to execute at 214, the AP disables itself at 216 from participating in the monitoring of the SBSP boot process. APs that are healthy at 214 maintain a boot time elapse counter by reading the processor/chipset specific Interval Timer Counter (ITC) at 218, and setting the start time variable. The APs periodically check the SBSP boot progress (for example, by checking the chipset Scratch Register) against the elapsed timer counter to determine the SBSP progress status at 224. If the SBSP fails to complete the boot process within the allowed time interval at 226, the AP logs at 228 the identity of the current SBSP to a sticky register in each processor package (core), and then reinitializes at least a portion of the system (and/or reboots the system). When the system comes up the next time, each processor will check to see if it failed as the SBSP in the previous boot by referring to its sticky register. If so, it will not attempt to become the SBSP, and instead will disable itself. If the SBSP boot progresses sufficiently (as indicated by a write to a chipset register late in the boot process), the APs will stop monitoring the SBSP boot progress and will either return to idling or to other activity determined by system boot. If the AP is requested to join the boot at 230, the AP will join the system boot at 232.

Although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, the interfaces that transmit and/or receive signals, etc.), and others.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Although flow diagrams and/or state diagrams may have been used herein to describe embodiments, the inventions are not limited to those diagrams or to corresponding descriptions herein. For example, flow need not move through each illustrated box or state or in exactly the same order as illustrated and described herein.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. A method comprising:
monitoring a boot progress of a System Boot Strap Processor in a multi-processor system using an Application Processor;
detecting a boot processor failure using the Application Processor;
reinitializing at least a portion of the system if the boot processor failure is detected; and
wherein if the System Boot Strap Processor progresses sufficiently, stopping the monitoring and returning the Application Processor to an idle state.

2. The method of claim 1, wherein on detecting the boot processor failure, only a portion of the system is reinitialized.

3. The method of claim 1, wherein on detecting the boot processor failure, the reinitializing includes rebooting the system.

4. The method of claim 1, wherein the System Boot Strap Processor and the Application Processor are cores in a multi-core processor package.

5. The method of claim 1, further comprising if a boot processor failure is detected, logging the identity of the System Boot Strap Processor before the reinitializing.

6. The method of claim 1, wherein the boot processor failure is detected by checking progress of the System Boot Strap Processor against an elapsed time.

7. The method of claim 1, wherein if the System Boot Strap Processor progresses sufficiently, stopping the monitoring of System Boot Strap Processor progress using the Application Processor.

8. A system comprising:
a System Boot Strap Processor; and
an Application Processor to monitor a boot progress of the System Boot Strap Processor, to detect a boot processor failure, and to reinitialize at least a portion of the system if the boot processor failure is detected;
wherein if the System Boot Strap Processor progresses sufficiently, the Application Processor to stop monitoring the boot progress and to return to an idle state.

9. The system of claim 8, wherein on detecting the boot processor failure, the Application Processor is to reinitialize only a portion of the system.

10. The system of claim 8, wherein on detecting the boot processor failure, the Application Processor is to reboot the system.

11. The system of claim 8, wherein the System Boot Strap Processor and the Application Processor are cores in a multi-core processor package.

12. The system of claim 8, wherein if a boot processor failure is detected, the Application Processor is to log the identity of the System Boot Strap Processor before reinitializing at least the portion of the system.

13. The system of claim 8, wherein the Application Processor is to detect the boot processor failure by checking progress of the System Boot Strap Processor against an elapsed time counter.

14. A system comprising:
a first processor; and
a second processor;
wherein one processor of the system becomes a System Boot Strap Processor, and all other processors of the system become Application Processors, wherein at least one Application Processor is to monitor a boot progress of the System Boot Strap Processor, to detect a boot processor failure, and to reinitialize at least a portion of the system if the boot processor failure is detected;
wherein if the System Boot Strap Processor progresses sufficiently, the at least one Application Processor to stop monitoring the boot progress and to return to an idle state.

15. The system of claim 14, where the processors are multi-core processors.

16. The system of claim 14, wherein on detecting the boot processor failure, the Application Processor is to reinitialize only a portion of the system.

17. The system of claim 14, wherein on detecting the boot processor failure, the Application Processor is to reboot the system.

18. The system of claim 14, wherein the System Boot Strap Processor and at least one of the Application Processors are cores in a multi-core processor package.

19. The system of claim 14, wherein if a boot processor failure is detected, the Application Processor is to log the identity of the System Boot Strap Processor before reinitializing at least the portion of the system.

20. The system of claim 14, wherein the Application Processor is to detect the boot processor failure by checking progress of the System Boot Strap Processor against an elapsed time counter.

21. An article comprising:
a computer readable storage medium having instructions thereon which when executed cause a computer to:
monitor a boot progress of a System Boot Strap Processor in a multi-processor system using an Application Processor;
detect a boot processor failure using the Application Processor; and
reinitialize at least a portion of the system if the boot processor failure is detected;
the computer readable medium having instructions thereon which when executed further cause a computer to stop the monitoring and return the Application Processor to an idle state if the System Boot Strap Processor progresses sufficiently.

22. The article of claim 21, the computer readable storage medium having instructions thereon which when executed further cause a computer to: reinitialize only the portion of the system if the boot processor failure is detected.

23. The article of claim 21, the computer readable storage medium having instructions thereon which when executed further cause a computer to: reboot the system if the boot processor failure is detected.

24. The article of claim 21, wherein the System Boot Strap Processor and the Application Processor are cores in a multi-core processor package.

25. The article of claim 21, the computer readable storage medium having instructions thereon which when executed further cause a computer to:
if a boot processor failure is detected, log the identity of the System Boot Strap Processor before the reinitializing.

26. The article of claim 21, the computer readable storage medium having instructions thereon which when executed further cause a computer to detect the boot processor failure by checking progress of the System Boot Strap Processor against an elapsed time.

* * * * *